Dec. 4, 1951          H. W. TETER          2,577,491
MEASURING INSTRUMENT WITH REGISTERING MEANS
Filed Feb. 17, 1947
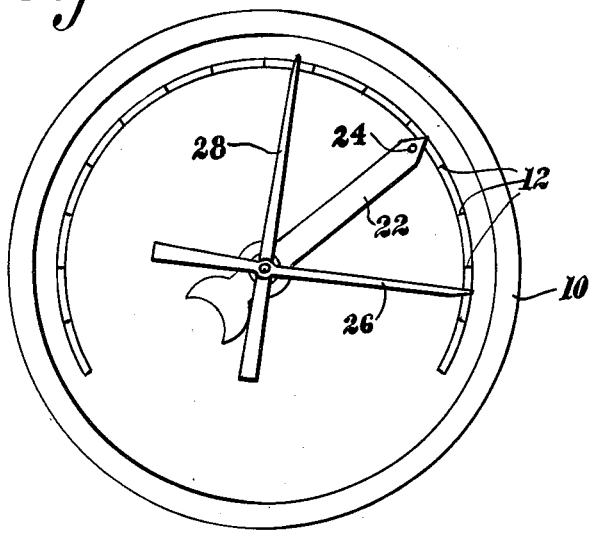
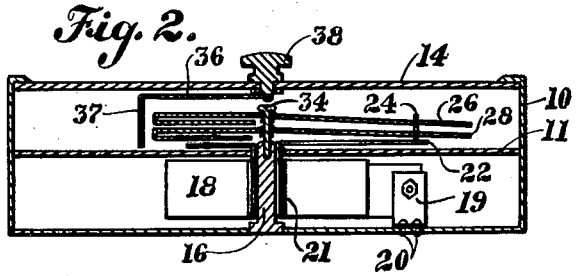
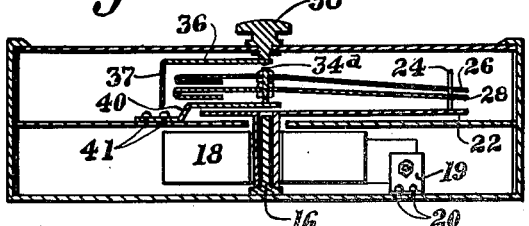
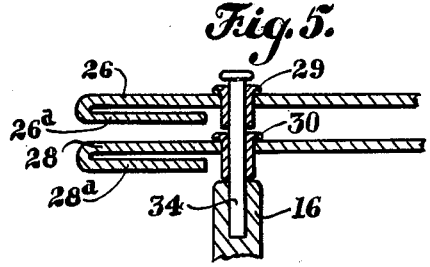
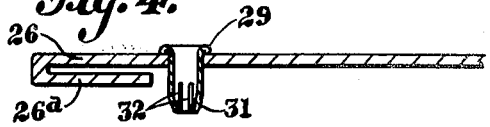
INVENTOR.
Howard W. Teter
BY Harold E. Cole
Attorney Patented Dec. 4, 1951

2,577,491

UNITED STATES PATENT OFFICE 2,577,491

MEASURING INSTRUMENT WITH REGISTERING MEANS

Howard W. Teter, Wellesley, Mass.

Application February 17, 1947, Serial No. 728,970

2 Claims. (Cl. 116—129)

This invention relates to a thermometer with mechanism to register minimum and maximum temperatures.

The principal object of my invention is to provide a thermometer or similar device of practical construction that will register either the lowest temperature or the highest temperature, or on some occasions registers both, in a certain length of time.

Another object is to provide easily operated resetting mechanism adapted to move both high and low registering arms to a predetermined position which is usually adjacent the temperature indicating pointer.

A further object is to provide improved operating means to effect the foregoing results that are simple and economical to manufacture and use, hence enable me to bring my thermometer within the purchasing power of persons in ordinary financial circumstances.

I am aware that others have made thermometers to register minimum and maximum temperatures, hence it is my particular object to improve upon the construction of operating or moving parts to provide a thermometer that is practical both from a user's and a commercial point of view.

The foregoing and other objects which will appear as the nature of the invention is better understood, may be accomplished by a construction, combination and operative arrangement of parts, such as is disclosed by the drawings and specification. The nature of the invention is such as to render it susceptible to various changes and modifications, and, therefore, I am not to be limited to said disclosure; but am entitled to all such changes therefrom as fall within the scope of my claims.

In the drawings:

Figure 1 is a top plan view of my thermometer without the resetting mechanism. Figure 2 is a sectional view of my thermometer taken through the center from top to bottom.

Figure 3 is a sectional view similar to said Figure 2 of a modified construction.

Figure 4 is an enlarged, fragmentary, sectional view of the construction shown in Figures 1 and 2, showing a registering arm attached to a bushing before a shaft is inserted in the bushing.

Figure 5 is an enlarged, fragmentary, sectional view of the construction shown in Figures 1 and 2, showing two registering arms attached to bushings that are rotatably mounted upon a shaft driven through said bushings into a supporting post.

As illustrated, my thermometer has the usual casing or external support 10 mounted within which is the dial or face 11 bearing the usual gradation marks 12 by which the temperature may be read. Said casing has a transparent crystal 14 that serves as a top or cover.

Fixed to the bottom of said casing 10 is a post 16. Adjacent said post 16 is a well known temperature responsive element 18 in the form of a bi-metallic spiral member which is attached to a lug 19 held to said casing 10 by bolts 20. Around said post 16 is rotatably mounted a sleeve 21 to which the usual temperature indicating pointer 22 is attached as well as the inner end of said bi-metallic spiral member 18. Said pointer carries a push pin 24 near its outer end that extends upwardly.

A registering arm 26 has a doubled-over portion 26a, serving as a counterweight, at its inner or attaching end to provide balance for said arm. It may be rotatably moved to the right as shown in said Figure 1 by said push pin 24 pushing against it as said temperature indicating pointer 22 moves in response to said bi-metallic element 18 to indicate higher temperature. Another registering arm 28, having a doubled or counterweight portion 28a is similar to said arm 26 except that it is positioned to rotatably move to the left by said push pin 24 when said pointer 22 moves to indicate lower temperature. When said pointer 22 moves away from either of said registering arms 26 or 28 the latter remain in the position where they are left, hence they serve to register either the maximum temperature or the minimum temperature that said pointer 22 reached. It will be observed that said pointer 22 is wider than said arms 26 or 28, hence the points of said arms at their outer ends are directly above the outer point of said pointer 22 when said arms 26 and 28 are in contact with said push pin 24, in which position they are immediately ready to move with said indicating pointer 22.

Fixed to and movable with said arm 26 is a bushing 29 which extends through a portion of said arm 26. A similar bushing 30 is fixed to and extends through a portion of said arm 28. Said bushings 29 and 30 can independently rotate about a small shaft 34 fixed to said post 16 when pressure of said push pin 24 against said arm 26 or 28 moves said arm. Said shaft 34 is preferably co-axial with said post 16.

In order to provide a friction fit of said bushings 29 and 30 on said shaft 34 said bushings are preferably tapered at their lower ends as shown in said Figure 4. Several slits 32 extend lengthwise in the tapered portion to permit some spreading of said bushings. Said shaft 34 is preferably of such size that it has to be driven through said tapered portions 31 thus spreading them and making a friction fit between said bushings and said shaft 34 so that slight pressure is required to rotate said bushings 29 and 30 on said shaft. This pressure is supplied by movement of said push pin 24 against a said register arm 26 or 28 as heretofore explained.

To obtain a new registering of the maximum or minimum temperature said registering arms 26 and 28 are reset by means of a resetting member 36 that has a push finger 37 extending downwardly as its outside end. This member 36 is mounted to a hand knob 38 attached to it that is rotatably mounted and extends outside the casing top or crystal 14. Said resetting member 36 extends at a right angle to said knob 38 and said push finger 37 extends at a right angle to the adjoining portion of said member 36 hence rotation of said hand knob 38 causes said push finger 37 to push against either a said registering arm 26, or 28, depending upon the direction of rotation. Thus said arms may be returned to a position where they are directly above said pointer 22 where any movement of the latter will move one of said arms with it. Said hand knob 38 is frictionally mounted to resetting member 36 so that if said knob 38 is rotated too far said knob 38 and resetting member 36 will slip relative to each other.

In Figure 3 of the drawings a modified construction is shown in which a bracket 40 is bolted as at 41 to said dial 11. A post 34a is fixed to said bracket 40. Said bushings 29 and 30 are frictionally and rotatably mounted on said post 34a which should be substantially co-axial with said post 16. Other parts are the same as shown in said Figure 2.

What I claim is:

1. A measuring instrument comprising a casing, a moving system having a main indicating pointer embodying a push member extending angularly therefrom, a shaft separate from said pointer, a supporting member supported by said casing in which said shaft is fixedly mounted, a maximum registering arm and a minimum registering arm at opposite sides of said pointer push member and rotatably mounted on said shaft, said two arms being so positioned that they are in a path of movement of said push member on said pointer, a resetting member rotatably mounted on said casing and spaced from said shaft and embodying a push finger extending angularly therefrom and so positioned that it is adapted upon movement thereof to move into contact with and move either of said arms.

2. A measuring instrument comprising a casing embodying a transparent cover, a moving system within said casing having a main indicating pointer embodying a push member extending angularly therefrom, a shaft separate from said pointer, a supporting member supported by said casing in which said shaft is fixedly mounted, a maximum registering arm and a minimum registering arm at opposite sides of said pointer push member and rotatably mounted on said shaft, said two arms being so positioned that they are in a path of movement of said push member on said pointer, a resetting member rotatably mounted on said casing cover and spaced from said shaft and embodying a push finger extending angularly therefrom and so positioned that it is adapted upon movement thereof to move into contact with and move either of said arms.

HOWARD W. TETER.

REFERENCES CITED

The following references are of record in the file of this patent:

UNITED STATES PATENTS

| Number | Name | Date |
| --- | --- | --- |
| 68,681 | Ames | Sept. 10, 1867 |
| 356,761 | Haight | Feb. 1, 1887 |
| 958,424 | Niemann | May 17, 1910 |
| 1,478,258 | Schlaich | Dec. 18, 1923 |
| 2,048,512 | Oakley | July 21, 1936 |
| 2,110,391 | Davis | Mar. 8, 1938 |
| 2,171,183 | Lamb | Aug. 29, 1939 |

FOREIGN PATENTS

| Number | Country | Date |
| --- | --- | --- |
| 4,769 | Great Britain | Apr. 17, 1885 |